Jan. 20, 1942. J. A. BALL 2,270,749
COLOR PHOTOGRAPHY
Filed Feb. 27, 1939 2 Sheets-Sheet 1
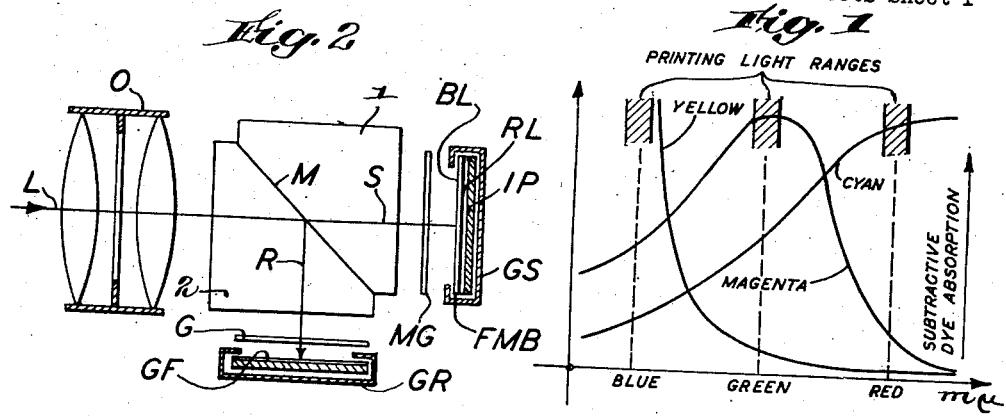
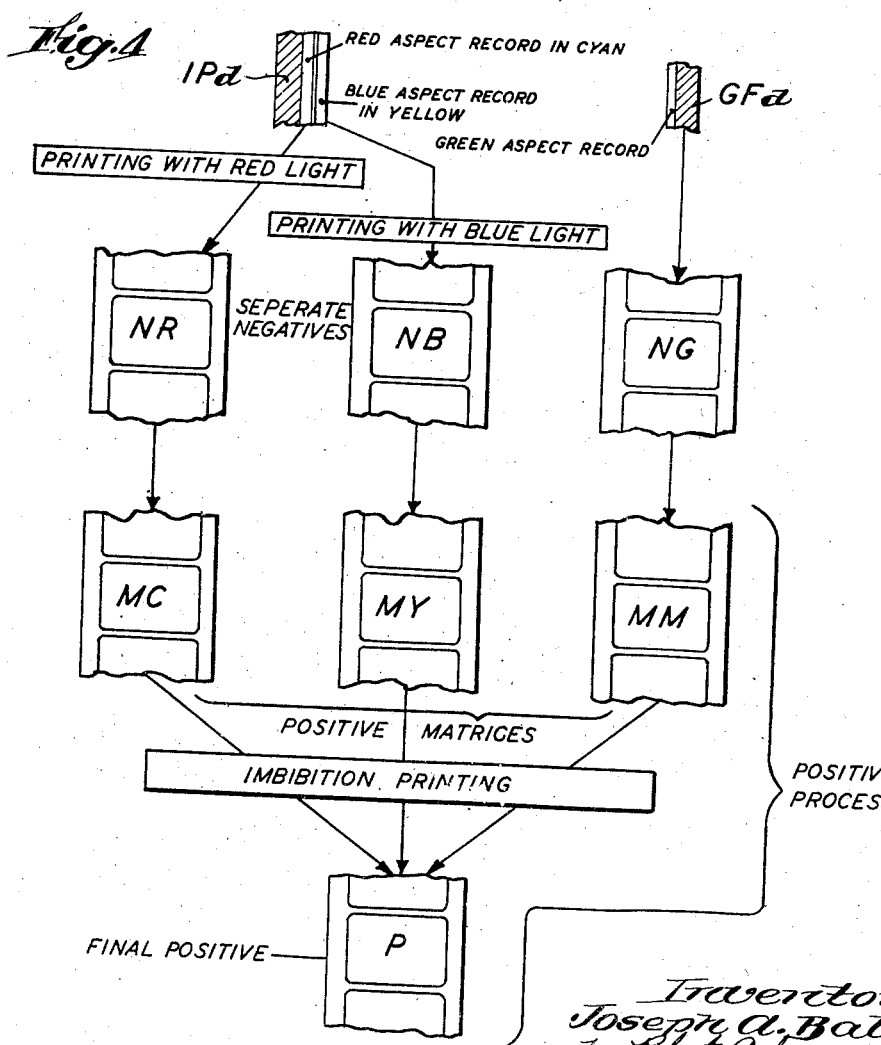
Inventor:
Joseph A. Ball,
by Roberts, Cushman & Woodberg
his Attys.

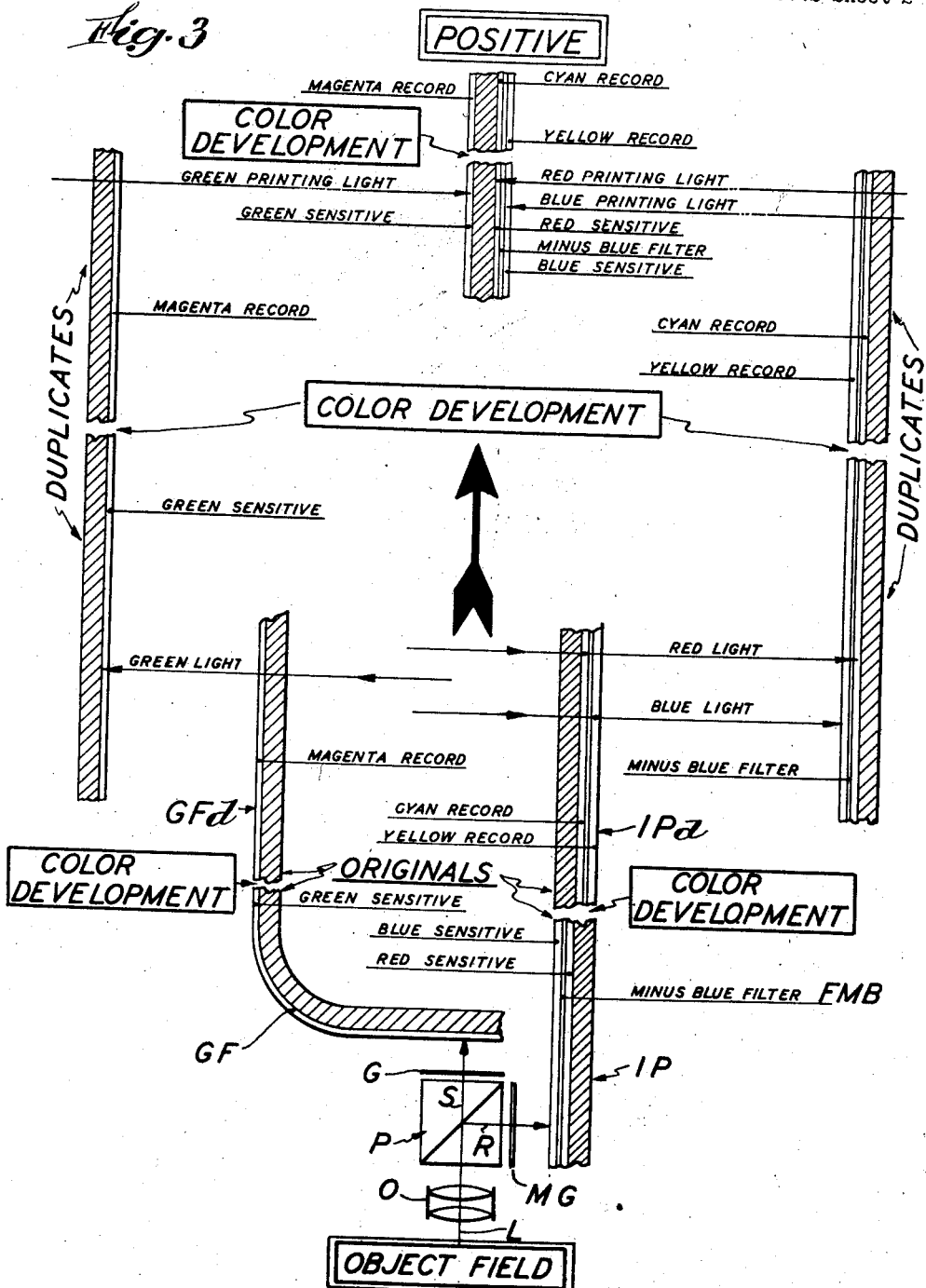

Patented Jan. 20, 1942

2,270,749

UNITED STATES PATENT OFFICE 2,270,749

COLOR PHOTOGRAPHY

Joseph A. Ball, Los Angeles, Calif., assignor to Technicolor Motion Picture Corporation, Los Angeles, Calif., a corporation of Maine Application February 27, 1939, Serial No. 258,678

2 Claims. (Cl. 95—2)

Among the many previously proposed methods for taking original color aspect records and for making therefrom positives suitable for commercial motion picture projection, there are a few which have been found to be of practical importance.

One taking method involves the separation into several components of the light incident from the object field, and the exposure of separate films with the component beams, provisions being made for recording on the respective films only light of the desired wave length range.

Another taking method utilizes superimposed emulsion layers which are simultaneously exposed, the light penetrating one or two transparent sensitive strata in order to reach the emulsion layer therebehind. The component emulsions may be applied to individual supports for each layer, and are then referred to as bipacks or tripacks; exposure light has to penetrate at least one of the supports. Several emulsion layers carried by a single support are referred to as integral bipacks or integral tripacks. (For the terminology herein used compare "Journal of the Society of Motion Picture Engineers," 1935, page 5 et seq. and 1936, page 164 et seq.). The differentiation of the superimposed records of integral packs offers considerable difficulty, but the problem has now been solved for most purposes in various ways. The layers may, for example, be differently toned or dyed after development (Reissue Patent No. 18,680); or, all layers may be developed in one color, whereupon all but one layer are bleached and re-developed in another color (British Journal of Photography, 1936, page 194 et seq.); or, records obtained by consecutive reversal exposures with colored light may be consecutively developed in the appropriate colors (U. S. Patent No. 1,900,870); or, dyes may be incorporated in the respective layers and bleached under control of the silver image upon developement (British Patent No. 375,338); or individual colors may be simultaneously developed in the respective layers by incorporating therein different color formers (French Patent No. 803,566). The emulsion layers may be applied either to one or to both sides of the carrier, or emulsion particles of different character may be intermingled.

Taking methods using superimposed emulsions on more than two supports were found impractical for motion picture purposes, and even those employing two supports, the so-called bipacks, offer certain difficulties. Superimposed emulsion layers on a single support are preferable for various reasons; for example, they furnish better definition, and do not require special provisions for assuring proper contact during exposure. Also, no light is lost through absorption in a film support.

For positive projection, subtractive prints can be made with the aid of films with several emulsion layers processed according to one of the above-mentioned methods, or the color aspect positives may be mechanically printed from matrices, as for example by the well known imbibition process.

Any one of these positive processes may be combined with any one of the above mentioned taking methods.

These methods lend themselves with comparatively few difficulties to so-called "two color" photography, where the visible spectrum is divided into two aspects, the blue-green on the one hand and the orange-red on the other hand. As well known, this type of color photography is, generally speaking, unsatisfactory. In order to reproduce the full color range, it is necessary to divide the visible spectrum into three separately recorded ranges. This circumstance causes considerable difficulties when it comes to the practical application of the above-mentioned methods.

Integral packs with three different emulsions present practical difficulties due to the necessity of two transparent emulsion layers, of very thin individual emulsion strata, of provisions (filters, sensitization) for separating the color ranges, and especially due to the parctical problems incidental to differently coloring, and separating for printing, of three superimposed records. All these problems become indeed more difficult of solution quite out of proportion with the mere structural change from two to three emulsion elements.

Similarly, the systems utilizing superimposed emulsions on individual supports become more or less impractical if employed for three-color photography. Tripacks, that is three emulsions on three superimposed supports, respectively, are clearly out of the question due to excessive light absorption and the image plane problem, there being at least two different record planes in a single light beam.

Devices for dividing an incident beam into three component beams are rather complicated and expensive, and absorb a great deal of light due to the necessarily longer light paths in glass.

Systems utilizing a light divider together with two emulsions on two superimposed supports (bipack) in one component beam, as for example described in U. S. Patents Nos. 1,889,030 and 2,000,058, have proved to be quite successful in actual practice, but the use of a bipack involves certain inconveniences due to the above-mentioned characteristics in any system using superimposed emulsion supports.

It has been proposed to use a two-color lenticular support film with a superimposed back film on a separate support, but this arrangement has all disadvantages of the bipack system mentioned above in addition to those of the lenticular support system.

It is the main object of the present invention to provide an improved method of color photography by combining certain features of the above-outlined systems using for three records two separate and single supports, respectively, according to a peculiar arrangement eliminating defects inherent in both above-mentioned taking methods by recording two color aspects upon emulsion layers, strata or particles on a single support, and the third aspect upon an emulsion on a separate support, the two supports locating their respective emulsions for exposure in two component beams obtained by dividing the incident light.

In one of its various aspects, the invention improves the usefulness of integral pack film processes, for recording the original object field as well as printing reproductions, by simplifying the processing of the integral packs employed.

In another aspect, it provides a system which permits the use of an integral bipack for recording purposes and of multilayer film for printing from originals obtained with that system. By using only two layer integral pack film for original recording, most of the difficulties of making and processing such film are eliminated or greatly reduced, since these difficulties are a great deal due to the presence of a third emulsion element; in other words, the introduction of the third element not merely adds, with that third element, problems also inherent in each layer of an integral two layer film, but newly introduces difficulties not at all encountered with the latter.

In still another aspect of this invention, I propose a new method of making color prints on a single support by recording, in two different apertures of the camera, three color separation aspects on emulsions carried by only two supports in the respective apertures, and by printing the three aspects upon a single support.

Printing procedures which yield especially improved results if combined with the taking procedure herein proposed are of the types which utilize dye transfer from gelatin matrices and also those employing three silver halide emulsion layers on a single support which are developed in color or otherwise colored, or contain initially colored or uncolored substances whose ultimate color intensity is controlled or developed through the silver record.

Another feature of my invention is a peculiar distribution of filters and emulsion sensitivities, adapted to furnish especially favorable results with certain modifications of negative recording.

In one embodiment, I record the two color aspects upon an integral bipack and the third aspect on a separate film, and use corresponding records in complementary colors for printing in a manner avoiding falsification due to undesired light absorption properties of subtractive coloring matter which arrangement provides especially favorable color separation during exposure and printing.

A further object of my invention is to provide an optical arrangement for a three-color motion picture camera making possible a simple, rugged and comparatively cheap construction involving the least possible loss of light without dependence on bipacks.

The invention also takes account of the fact that it is necessary, in commercial motion picture photography, to have in addition to the original records duplicate negatives or master positives, the originals being on file whereas the duplicate or master films are used for making the positive prints and, if necessary together with the originals, for producing dissolves, fadeouts, combination prints and other special types of positives. The invention further provides the possibility of judging the colors as soon as possible and during as many steps of the entire process as possible.

These and other objects, aspects and features of my invention will be apparent from the following description of several concrete embodiments as examples of its genus. This description refers to drawings in which:

Fig. 1 is a diagram indicating the light absorption of subtractive coloring matters;

Fig. 2 is a diagrammatic view of an optical arrangement according to one embodiment of the invention;

Fig. 3 is a flow diagram explaining an embodiment of the invention; and

Fig. 4 is a flow diagram explaining another embodiment according to my invention.

As mentioned above, the recording and printing of three color photographs on integral tripacks presents considerable difficulties, many of which are overcome by using, according to the invention, an integral bipack in one aperture of a light-dividing camera, and a conventional film for the third record in the second aperture of such a camera, this arrangement permitting the use of simple and efficient light-dividing devices, for example of the type herein described, and greatly simplifying the processing of the pack.

In addition to the above-mentioned principal advantage of eliminating of the difficulties inherent in three layer films and in bipacks with two supports, the present invention introduces an important improvement by selecting certain color aspects for separate recordation according to a principle which will now be discussed before explaining in detail an embodiment of this modification.

For various reasons, one of which is pointed out above, integral pack records are preferably developed in the subtractive color ranges complementary to the color aspect ranges. However, as well known, it is practically impossible to separate without considerable falsification color aspects, recorded in the subtractive ranges yellow (minus blue), magenta (minus green) and cyan (minus red), by printing with light absorbed by the respective subtractive part records. As indicated in Fig. 1, the absorption ranges of subtractive coloring matters overlap considerably. Therefore, if for example the yellow record,—superimposed on magenta and cyan records,—is copied with blue light, the magenta record as well as the cyan record contribute undesired density patterns since they likewise absorb some blue light. The green printing will pick up a certain amount of the cyan record densities, whereas the red light provides a comparatively pure copy of cyan record. Now, according to the invention, one of the offending records (cyan and magenta), for example the magenta colored record of the green aspect, is separately taken, and can therefore be printed without introducing falsifying components in the two other records. It will be evident from Fig. 1 that for example the removal of the magenta record merely leaves a contamination of the yellow copy, which is rather slight and, moreover, of secondary importance due to the fact that the yellow record does not materially contribute to definition and gradation of the final picture.

An embodiment of the invention will now be described in detail.

As indicated in Fig. 2, a light divider P is associated with two single films IP and GF. P is a light divider of well-known construction comprising two prisms 1, 2 with a partly reflecting surface M therebetween. An objective O directs a light beam L towards transparent reflector M which divides it in a directly transmitted beam S and a reflected beam R. Preferably in the direct beam S (although it is quite feasible to have it in the indirect beam R) is arranged a conventional film gate GS for film IP, and another film gate GR is mounted in the reflected beam R, guiding in the usual manner film GF.

Film IP has two emulsion strata BL and RL, respectively, which may be separated by a filter layer FMB. Layer BL is blue sensitive, layer RL is red sensitive, and intermediate filter layer FMB absorbs the blue rays emerging from the layer BL. If required by a certain sensitivity for green of the rear emulsion RL, a minus green filter MG may be inserted in front of integral bipack IP, determining the cut towards the red range of the integral filter FMB. If, however, the rear film is essentially insensitive to the colder colors, one or both filters may be omitted.

In order to avoid absorption of certain wave length ranges in layers which should be exposed by light of these ranges, this original recordation film is preferably chosen from those above-mentioned types whose sensitive layers do not have coloring matter initially incorporated therein. The third color aspect is recorded on green sensitive film GF which may be preceded by a green transmitting filter G.

The latent negative records are thereupon developed in colors substantially complementary to the emulsion sensitivity ranges as modified by the taking filters, according to any of the now available above-mentioned processes. Hence, there is now at hand a positive integral bipack film strip with an outer positive picture in yellow and an inner positive picture in cyan, whereas the second strip carries a record of the green color aspect, which record consists preferably of magenta coloring matter, although any other medium may be used.

These records are then printed (compare Fig. 3) with appropriate light. The spectral range of the printing light is irrelevant as far as the single record strip is concerned, so long as that part thereof is absorbed by the record to which the duplicate printing emulsion is sensitive.

Concerning the second, double record, strip, each respective record must be printed with light transmitted by the other record. For example, the outer yellow (minus blue) record will be printed with blue light transmitted by the inner, cyan (minus red) record, the latter being printed with red light transmitted by the outer record. The two superposed records may be printed simultaneously or consecutively, and they may also be printed on separate emulsions for purposes to be described hereinafter.

For reasons pointed out above, it is practically very desirable to have two duplicate positives, carrying one and two records, respectively, in subtractive colors, and therefore being available for judging the true colors of the recordings.

From these duplicates, in the present preferred example, one with a magenta record, and the other with the yellow and cyan records, positives are now printed onto an integral pack film strip, for example a strip having two emulsion layers on one side and a single layer on the other side, as indicated in Fig. 3.

The integral bipack component of this tripack film may for example consist of an upper blue sensitive layer, an intermediate red or minus blue filter layer, and an inner red sensitive layer, the layers containing agents which, upon development, produce dyes at amounts controlled by the intensity of the developing silver record. The upper layer is printed from the yellow record with blue light, and the inner layer with red light from the cyan record.

The magenta duplicate is printed with green light onto the green sensitive emulsion on the other side of the strip.

It will be noted that, as desired, all records used during this process are made in their appropriate subtractive colors, and that the detrimental effect of printing through the magenta record is avoided since the latter is on a separate strip. It will be evident that all records can be printed simultaneously.

Instead of compensating for the falsification of prints from superimposed subtractive records by separating the magenta record, it will be evident from Fig. 1 that separation of the cyan record likewise eliminates practically any falsification of the cyan and magenta records. Although the falsification of the yellow record is somewhat more pronounced when the cyan record is separated, this disadvantage is of secondary importance (as pointed out above) and may sometimes be outweighed by other considerations; at any rate it will be clear that the separation of any one (preferably the magenta or cyan) of the superimposed subtractive records contributes a great deal to the solution of the very important and troublesome problem of overcoming the falsification of printings from superimposed records in subtractive colors. It should be noted that this problem is present not only when printing from transparencies, but also when photographing three or four color opaque prints in subtractive colors. This is an aspect which is of some importance especially in the field of still picture color photography, and I understand that the usefulness of my invention extends to such applications.

It will be further apparent that, instead of printing on positive and integral packs with two emulsion layers on one side and the third on the other side, positive stock with three directly superimposed layers can be used, preferably of the type whose emulsion layers do not initially contain coloring matter, so that the choice of sensitivity of the layers and of the printing light is free of the limitations which would be imposed by the absorption ranges of such coloring matters.

Instead of printing the two superimposed original records on a similarly organized duplicate film as shown in Fig. 3, they may also, or only, be printed on separate emulsions, for example for the purpose of obtaining three separate matrices for further use, as will now be described with reference to Fig. 4.

In Fig. 4, IPd denotes, as in Fig. 3, the integral monopack with the red and blue aspect records colored in different ranges, for example cyan (minus red) and yellow (minus blue) respectively. Similarly, GFd is the green aspect record which may be developed either in magenta (minus green) or as metallic silver record. From record IPd, two separate negatives NR and NB are printed with red and blue light respectively, and a negative NG may be printed from GFd.

From the three records NR, NB and NG, positive matrices MC, MY and MM are then made according to any suitable procedure. It is, however, understood that, instead of making intermediate or duplicate prints suitable printing matrices can be obtained according to any other suitable procedure, for example directly by reversing the separation films printed from IPd to obtain a reversal relief. Similarly, MM may be printed directly from GFd.

The three positives MC, MY and MM may be utilized for further reproduction according to any suitable process, but I prefer to obtain these positives in the form of gelatin reliefs to which are applied dyes of color ranges complementary to the filter ranges, that is of the ranges minus red (cyan), minue blue (yellow) and minus green (magenta). These dye records are then transferred in exact register to a positive film P receiving in this manner a subtractive record suited for reproduction with an ordinary projector, such an imbibition printing process being, for example, described in Patent No. 1,707,710, dated April 2, 1929.

Instead of using the color separation records obtained according to my invention for making imbibition transfer prints as above described, they can be employed to very good advantage for printing on monopack reproduction film in a manner similar to that described with reference to Fig. 3.

It will be understood that the above described embodiments are not the only feasible ones, but that coloring matter sensitivity and printing light ranges can be changed so long as care is taken that the various color aspects are recorded on the intended emulsion strata without affecting strata provided for the respective other records.

It will also be understood by any one conversant in practical color photography that I do not want to limit myself with the terms herein used, to any particular wave length ranges, which may vary quite considerably, as long as the correlation of filter and printing color ranges is properly taken care of. Generally speaking, the blue range will reach from about 400 to 500 mu, the gree range from 480 to 600 mu, and the red range from 580 to 700 mu.

Recapitulating, the invention provides in all embodiments three sharp individual color separation records which can not otherwise be obtained with only two light beams.

Only two films have to be handled in the entire three-color negative process, which especially simplifies the camera construction.

Additional advantages result if the red and blue color aspects are recorded on one support and the green aspect on a separate emulsion.

The modifications employing integral packs as original and duplicate records provide in addition a compensation of the falsification otherwise resulting from printing through superposed subtractive record. In all modifications originals and duplicates, or at least duplicates, in subtractive colors are available for judging the color quality of the recordings.

It will be evident that any light splitting arrangement can be used instead of the prism shown in Fig. 2, and that my invention is useful in certain branches of still picture photography.

It should be understood that the present disclosure is for the purpose of illustration only and that this invention includes all modifications and equivalents which fall within the scope of the appended claims.

I claim:

1. In the art of three color photography the method of producing color separation records involving the step of printing with light of selective color from superposed records in subtractive dyes, which may absorb light properly to be absorbed only by other records, which comprises dividing an image bearing light beam into two component beams, recording with one component beam the blue and red color aspects on two emulsion components superimposed upon a single support in yellow and cyan dyes, respectively, recording with the other component beam the green color aspect on a third emulsion upon a second separate support, reproducing said blue and red records by printing the respective component records on distinct emulsion layers with blue and red light, respectively, and printing said green record, undesired absorption of green printing light by the cyan record or of blue printing light by the magenta record, being in this manner substantially reduced.

2. In the art of three color photography the method of producing color separation records involving the step of printing with light of selective color from superposed records in subtractive coloring matters which absorb light properly to be absorbed only by the coloring matter of another record, comprising making a record on an individual support of the green color aspect, making records of the blue and red color aspects on two superimposed emulsion layers on a second support in yellow and cyan coloring matter, printing said superimposed yellow and cyan records with blue and red light respectively, and separately printing said first record, undesired absorption of green printing light by the cyan record or of blue printing light by the magenta record being in this manner substantially reduced.

JOSEPH A. BALL.